Figure 1:
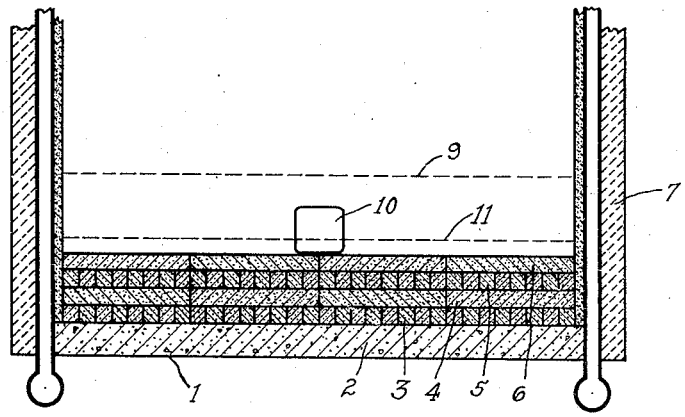

Dec. 19, 1933.    B. E. BROADWELL    1,940,115
BOTTOM FOR SLAG TAP FURNACES
Filed Oct. 8, 1930

INVENTOR
BARTLEY E. BROADWELL
BY
Thomas C. MacKay
ATTORNEY

Patented Dec. 19, 1933

1,940,115

UNITED STATES PATENT OFFICE 1,940,115

BOTTOM FOR SLAG TAP FURNACES

Bartley E. Broadwell, Lewiston, N. Y., assignor to The Republic Carbon Company, Niagara Falls, N. Y., a corporation of Delaware Application October 8, 1930. Serial No. 487,223

14 Claims. (Cl. 110—1)

The purpose of this invention is to provide an improved bottom for furnaces, particularly powdered coal furnaces, which are so arranged that the ashes accumulating in the combustion chamber are collected in liquid form in the bottom of the combustion chamber which is periodically tapped and the slag allowed to flow out. Furnaces of this type have proved highly efficient, but considerable difficulty has been experienced in constructing a furnace bottom to underlie the molten slag over a long period. Considerable difficulty has been experienced with bottoms made of ordinary refractory materials due to the fact that after an initial period of service the bottom expands and presses against the furnace walls to such an extent that it causes distortion and consequent weakening of the boiler structure and of the shell. This, I attribute to the permanent growth of many refractory materials on prolonged heating as well as to normal thermal expansion of the refractories upon heating.

Among other devices which have been used in attempting to overcome this difficulty, bottoms made of carbon have been used constructed as follows:

A. A mixture of carbonaceous materials containing for example, coal, coke, and a bituminous binder, is tamped into metallic cylinders and baked to remove the volatile constituents of the binder. These cylinders are then placed vertically on a properly supported bed of granular refractory material the space between the cylinders being filled by tamping with a similar carbon mix unbaked. This material is then baked into place by heating.

It is difficult if not impossible to tamp a mixture between the cylinders which will have uniform density or which will shrink uniformly on baking. Also the tamping and subsequent baking leave an irregularly porous rather than a compact mass. Because of these characteristics the bottom lacks mechanical strength, is subject to cracks, has an uneven surface on which the slag and molten metallic products collect in pools which cannot be tapped off, and is subject to penetration by these molten masses. The lack of uniform heat conductivity of various parts of the bottom also tends to cause unequal heating of the supporting materials.

B. Construction similar to that described in "A" but in which the containers of mix are replaced by carbon pillars. The difficulties encountered are the same as above, the leakage of the slag and metallic products through the bottom sometimes being sufficient to form a pool between the bottom and its support which raises sections of the bottom out of place.

I have discovered, however, that certain forms of carbon when protected from oxidation are admirably suited for use in furnace bottoms of this type as they have sufficiently low thermal conductivity to prevent serious heat losses with overheating of the supporting material, and have, in particular, a low coefficient of expansion and no tendency toward permanent growth so that the minimum strain is imposed on the furnace walls. The coefficient of expansion of various refractory materials is shown in the following table.

| | Mean coefficient of expansion $\times 10^{-6}$ per °C. |
|---|---|
| Fireclay | 5.3 |
| Silica | 8.3 |
| Silicon carbide | 4.3 |
| Alumina | 7.7 |
| Chromite | 10.4 |
| Magnesite | 14.7 |
| Carbon | 2.3 |

Carbon bodies may, moreover, be made extremely dense and impermeable so that there is no penetration of the slag through the pores of the material. I have discovered that a furnace bottom having the desired properties of moderate and uniform heat conductivity and a low coefficient of expansion, free from cracks and presenting a uniform surface may be formed by covering the floor of the furnace with unbaked carbon blocks, made for example, of a mixture of coal, coke and bituminous binder, suitably supported as for example on a layer of sand which in turn rests on a metal floor. Such blocks may, for example, be made of 50 parts each of anthracite coal and coke particles bonded with 20 parts by weight of coal tar pitch, the particle sizing and method of molding being those well known in the manufacture of carbon electrodes. A layer of granular material immediately supporting the carbon is advantageous in that it permits independent lateral motion of the carbon and the ultimate support.

These blocks being unbaked, when heat is applied, become plastic and consolidate into a "monolithic" mass, which on being raised to sufficiently high temperatures loses its volatile constituents and becomes thoroughly bound together by binder coke. The binding action may be aided by applying a layer of bituminous material on the adjoining faces of the blocks before baking. By "monolithic" I mean that the mass is substantially free from open seams, pockets or cracks and constitutes a single solid block, this use of the word being well recognized in the refractory art.

It is generally advantageous to lay several layers of blocks, the blocks in a given layer being laid with the joints between them at an angle to the joints between the blocks in the next adjoining layer, but this invention is intended to cover any form of construction in which the resulting baked bottom is of monolithic structure whether one or more layers of blocks have been used.

Figure 1 shows a furnace bottom constructed according to my invention.

In the practice of my invention, I proceed as follows:

Overlying the ultimate support for the furnace bottom which may, for example, be a steel plate 1 as shown in Figure 1, I place a layer of granular refractory material 2 such as sand and over this I lay a layer 3 of blocks of green or unbaked carbon, 4" x 4" x 48" for example, preferably placing tar in the joints between these blocks. Above the layer 3, I preferably place a layer 4 of similar material running at an angle to the first layer. Layer 4 may similarly be bonded in itself and also to layer 3 by means of tar if desired. Succeeding layers 5 and 6 may be provided if desired, the blocks comprising alternate layers being preferably at angles to one another, or staggered to break joints. The various layers should extend practically completely to the side walls 7 which are diagrammatically indicated as being of the common water wall type equipped with so-called Baily blocks on their inner faces.

After the various layers of blocks are laid in position a layer of sand covered by several layers of loose fire brick is added to give weight to insure thorough consolidation and to prevent too rapid heating of the blocks and to prevent the ready access of oxidizing gases to the carbon before a protective covering of slag has been formed. The furnace is then heated slowly, thus causing the material of the blocks to soften and permitting the blocks to become welded into a homogeneous and monolithic furnace bottom which has no cracks through which the slag may penetrate and which has been found to be extremely long lived and satisfactory. The slow heating of the furnace is continued until such time as the volatile binder of the blocks has distilled off after which the furnace may be operated in the normal manner.

I have found, however, that it is important that the surface of the carbon bottom be kept covered with a layer of slag at all times so that in the normal operation of the furnace the slag is allowed to accumulate until it reaches a level approximately as shown by dotted line 9 after which it is tapped out through door 10 until it reaches the level indicated by line 11, the depth of slag remaining above the carbon at line 11 being approximately 1" to 2".

I claim:

1. A steam boiler furnace bottom comprising a monolithic carbon layer supported by a layer of unbonded granular material.

2. A steam boiler furnace bottom comprising a monolithic carbon layer supported on a layer of unbonded granular material which is in turn supported by a metallic floor, the said granular layer permitting free movement of the carbon layer with respect to the metallic floor.

3. The process of baking carbon blocks into a monolithic mass as the bottom of a steam boiler furnace by utilizing the heat generated in the operation of the boiler.

4. The step in the process of forming a furnace bottom which comprises heating blocks of carbon containing a bituminous binder to cause the blocks to coalesce.

5. The process of forming a furnace bottom which comprises placing carbonaceous blocks capable of being softened by heat adjacent to one another and heating the furnace.

6. The step in the process of forming a carbon bottom in a boiler furnace which comprises protecting carbonaceous blocks from exposure to oxidizing gases while heating to cause the blocks to form a monolithic slab.

7. The process of making a monolithic carbon boiler furnace bottom which comprises forming a layer of unbaked carbon blocks side by side with their adjacent faces in substantially complete contact, and heating the blocks so placed.

8. The step in the process of forming a monolithic carbon boiler furnace bottom which comprises cementing carbon blocks laid side by side to one another with a bituminous adhesive.

9. The process of forming a monolithic carbon bottom in a furnace, which comprises placing unbaked carbon blocks adjoining one another therein, applying pressure to the upper surface of said blocks, and heating said blocks to cause them to coalesce.

10. An unburned furnace bottom comprising a plurality of pre-formed carbon blocks, the said blocks being composed of carbon and a thermoplastic bituminous binder.

11. An unburned furnace bottom comprising a plurality of close-fitting carbon blocks containing a thermoplastic bituminous binder, and an interstitial layer of bituminous binder between the said blocks.

12. An unburned furnace bottom comprising a plurality of pre-formed carbon blocks containing a thermoplastic bituminous binder, the said blocks being laid to form a substantially continuous structure wherein the respective sides of the blocks are contiguous.

13. An unburned steam boiler furnace bottom comprising a plurality of pre-formed close fitting carbon blocks, the said blocks containing a thermoplastic binder, and being adapted to coalesce into a monolithic whole upon the application of heat.

14. A monolithic steam boiler furnace bottom formed by the coalescence of pre-formed carbon blocks containing a thermoplastic binder.

BARTLEY E. BROADWELL.